United States Patent
Jung (10) Patent No.: US 10,431,076 B2
(45) Date of Patent: Oct. 1, 2019

(54) SMART CROSSWALK SAFETY SYSTEM FOR PEDESTRIAN

(71) Applicant: PASSNET CO., LTD.

(72) Inventor: Jung Hoon Jung, Gyeonggi-do (KR)

(73) Assignee: PASSNET CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/209,243

(22) Filed: Dec. 4, 2018

(65) Prior Publication Data

US 2019/0172342 A1    Jun. 6, 2019

(30) Foreign Application Priority Data

Dec. 4, 2017    (KR) .......................... 10-2017-0164848

(51) Int. Cl.
   *G08G 1/005*    (2006.01)
   *H04M 1/725*    (2006.01)
   (Continued)

(52) U.S. Cl.
   CPC ......... *G08G 1/005* (2013.01); *G06K 9/00369* (2013.01); *G08B 3/1033* (2013.01); *H04M 1/72569* (2013.01); *H04M 1/72577* (2013.01)

(58) Field of Classification Search
   CPC .... G08G 1/005; G08G 1/0112; G08G 1/0129; G08G 1/0141; G08G 1/0965; G08G 1/096716; G08G 1/096783; G08G 1/162; G08G 1/164; G08G 1/0116; G08G 1/017; G08G 1/04; G08G 1/056; G08G 1/075; G08G 1/09; G08G 1/09675; G08G 1/096758; G08G 1/096775;
   (Continued)

(56) References Cited

U.S. PATENT DOCUMENTS

| | | | |
|---|---|---|---|
| 2010/0207788 A1* | 8/2010 | Jones | G08G 1/095 340/932.1 |
| 2014/0197969 A1* | 7/2014 | Bernard | E01F 9/615 340/944 |

(Continued)

FOREIGN PATENT DOCUMENTS

| KR | 20090117149 | 11/2009 |
|---|---|---|
| KR | 101128003 | 3/2012 |

(Continued)

*Primary Examiner* — Daniel Previl
(74) *Attorney, Agent, or Firm* — IPLA P.A.; James E. Bame (57) ABSTRACT

A smart crosswalk safety system for a pedestrian comprises bollard devices disposed in a sidewalk, each bollard device including a pedestrian identification sensor detecting a pedestrian, a camera photographing an area including the crosswalk, a beacon device transmitting a beacon signal toward the crosswalk when an operation signal is received from a control device, the control device generating an operation signal to drive the beacon device when the bollard device identifies a pedestrian who walks from the sidewalk toward the crosswalk and a pedestrian is identified to be present in the pedestrian identification area of an image captured by the camera, and a lock screen application installed in the pedestrian terminal of a pedestrian who crosses a street at the crosswalk to change screen of the terminal to a locked state when a beacon signal is received.

7 Claims, 5 Drawing Sheets

(51) Int. Cl.
  *G06K 9/00* (2006.01)
  *G08B 3/10* (2006.01)
(58) Field of Classification Search
  CPC .. G08G 1/096791; G08G 1/143; G08G 1/144;
    G08G 1/165; G08G 1/166; H04W 4/021;
    H04W 4/80; H04W 48/16; H04W 4/008;
    H04M 1/72577; H04M 1/72552; H04M
    1/72572; H04M 2250/10; H04M 1/72569;
    H04M 1/72522; G08B 6/00; G08B
    3/1033; G08B 25/10; G08B 25/12; G08B
    25/14; G08B 3/10; G09B 21/003; G09B
    21/008; G01C 21/165; G01C 21/32;
    G01S 19/49; G01S 5/0072; G06K
    9/00369; G06K 9/2063; G06K 9/3258;
    C09D 5/22; E01F 9/30; F21S 8/083;
    F21V 21/14; F21V 23/04; F21W
    2131/103; F21Y 2115/10; G05D 1/0088;
    G05D 1/0236; G05D 2201/0213; G06Q
    30/0208; G06Q 30/0267; G07C 5/008;
    H05B 33/0803; H05B 33/0842; H05B
    37/0227; H05B 37/0245; H05B 37/0272;
    H05B 37/0281; Y02B 20/44
  USPC ....... 340/944, 907, 916, 917, 906, 925, 905,
    340/901, 933, 425.5, 480, 481, 910
  See application file for complete search history.

(56) References Cited

U.S. PATENT DOCUMENTS

| | | | |
|---|---|---|---|
| 2015/0084791 A1* | 3/2015 | Jang | G08G 1/07 340/944 |
| 2016/0295006 A1* | 10/2016 | Hannon | H04M 1/72572 |
| 2017/0038018 A1* | 2/2017 | Johnson | H05B 37/0227 |
| 2017/0042003 A1* | 2/2017 | Logvinov | H05B 37/0272 |

FOREIGN PATENT DOCUMENTS

| | | |
|---|---|---|
| KR | 20160036219 | 4/2016 |
| KR | 101635477 | 7/2016 |

* cited by examiner

FIG. 7

SMART CROSSWALK SAFETY SYSTEM FOR PEDESTRIAN

CROSS REFERENCE

The present application claims the benefit of Korean Patent Application No. 10-2017-0164848 filed 4 Dec. 2017 with the Korean Intellectual Property Office, the entire contents of which are incorporated herein by reference.

BACKGROUND

The present invention relates to a smart crosswalk safety system for a pedestrian, in which a pedestrian who walks from a sidewalk toward a crosswalk is identified through a bollard device and a screen of the terminal of the pedestrian is changed into a locked state in response to a beacon signal generated by a beacon device only when the pedestrian is located in a pedestrian identification area configured in the crosswalk of a street based on an image captured by a camera so that the pedestrian can safely cross the street at the crosswalk while looking round without keeping eyes on his or her pedestrian terminal.

In order to prevent crosswalk traffic accidents that are increasing every year, there emerges a pedestrian detection apparatus in which supports are disposed on sidewalks on both sides of a crosswalk and a light-emitting unit and a light-receiving unit are configured in each of the supports to detect a pedestrian adjacent to the crosswalk.

The pedestrian detection apparatus may provide a pedestrian adjacent to the pedestrian detection apparatus with guidance broadcasting, notifying the pedestrian that he or she must step back from the crosswalk, when red lights according to walk prohibition are turned on while operating in conjunction with crosswalk traffic lights, and may provide guidance broadcasting, notifying the pedestrian that he or she may cross a street, when green lights according to walk permission are turned on.

However, such a pedestrian detection apparatus has a problem in that it cannot effectively prevent the occurrence of a traffic accident because it provides only simple guidance broadcasting.

For example, pedestrians who cross a street while using wireless terminals, such as smartphones, are increasing. Accordingly, safety accidents, occurring because a pedestrian focuses his or her attention on a smartphone and crosses a street in response to a movement of surrounding people while checking crosswalk traffic lights, are increasing.

Furthermore, although such a pedestrian checks the green lights of crosswalk traffic lights, he or she tends to immediately avert his or her eyes to a smartphone and to cross a street without checking surroundings. Accordingly, a pedestrian who is injured by a vehicle is also increasing.

Accordingly, the existing pedestrian detection apparatus does not provide an alternative for preventing such an accident, and thus there is a need for the development of a pedestrian protection system capable of solving such problems.

SUMMARY OF THE INVENTION

An object of the present invention is to provide a smart crosswalk safety system for a pedestrian, in which a pedestrian who walks from a sidewalk toward a crosswalk is identified through a bollard device and a screen of the terminal of the pedestrian is changed into a locked state in response to a beacon signal generated by a beacon device only when the pedestrian is located in a pedestrian identification area configured in the crosswalk of a street based on an image captured by a camera so that the pedestrian can safely cross the street at the crosswalk while looking round without keeping eyes on his or her pedestrian terminal.

Another object of the present invention is to provide a smart crosswalk safety system for a pedestrian, in which a screen of the terminal of a pedestrian is changed into a locked state while the pedestrian crosses at a crosswalk by driving a beacon device when the pedestrian is located in the crosswalk based on an image of the crosswalk captured by a camera, thereby preventing the pedestrian from keeping eyes on the terminal regardless of the pedestrian signal lights of the crosswalk.

A smart crosswalk safety system for a pedestrian according to an embodiment of the present invention includes bollard devices 100 disposed in a sidewalk where a pedestrian waits to cross a street at a crosswalk in such a way to face each other adjacent to one side of the crosswalk, each bollard device including a pedestrian identification sensor 110 for detecting a pedestrian who walks from the sidewalk toward the crosswalk and a pedestrian who walks from the crosswalk toward the sidewalk; a camera 200 configured to photograph an area including the crosswalk; a beacon device 300 configured to transmit a beacon signal toward the crosswalk when an operation signal is received while communicating with the control device 400 and to block the transmission of a beacon signal when a release signal is received from the control device 400; the control device 400 configured to control the bollard device 100 and the beacon device 300; and a lock screen application 500 installed in a pedestrian terminal of a pedestrian who crosses the street at the crosswalk to change a screen of the terminal into a locked state when a beacon signal is received.

The control device 400 includes a bollard device management unit 420 configured to analyze a detection signal detected by the bollard device 100 while communicating with the bollard device 100 and to provide a warning signal to the bollard device 100 when a pedestrian who walks from the sidewalk toward the crosswalk is identified based on a result of the analysis; a camera image management unit 430 configured to configure a pedestrian identification area for identifying the pedestrian who has entered the crosswalk in an image received from the camera 200 and to identify whether the pedestrian is located in the pedestrian identification area; a beacon device management unit 440 configured to provide an operation signal so that a beacon signal is transmitted or provide a release signal so that a beacon signal is not transmitted while communicating with the beacon device 300; and a beacon signal generator 450 configured to generate an operation signal to drive the beacon device 300 and provide the generated operation signal to the beacon device management unit 440, when the bollard device management unit 420 identifies a pedestrian who walks from the sidewalk toward the crosswalk and the camera image management unit 430 identifies the pedestrian located in the pedestrian identification area, and to generate a release signal to release an operation of the beacon device 300 and provide the generated release signal to the beacon device management unit 440 in other conditions.

The lock screen application 500 includes a beacon signal reception identification unit 510 configured to receive a beacon signal received by a pedestrian terminal; a lock screen signal generator 520 configured to generate a lock screen signal for the terminal when a beacon signal is received by the beacon signal reception identification unit 510; a lock screen unit 530 configured to change a screen of the pedestrian terminal into the locked state when a lock screen signal is generated by the lock screen signal generator 520; and a lock screen release unit 550 configured to restore the locked state of the screen to an original state when a lock screen signal is not generated in a state in which the screen of the pedestrian terminal has been changed into the locked state.

The pedestrian identification sensor 110 includes a pair of a first pedestrian identification sensor 111 having a first light-emitting unit and a first light-receiving unit and a second pedestrian identification sensor 112 horizontally positioned and spaced apart from the first pedestrian identification sensor 111 and having a second light-emitting unit and a second light-receiving unit.

The control device 400 further includes a pedestrian signal management unit 410 configured to receive state information about a signal state of a pedestrian signal light. The bollard device management unit 420 includes a detection signal receiver 421 configured to receive first and second detection signals detected by the first and second pedestrian identification sensors 111 and 112 of the bollard device 100; a pedestrian identification unit 422 configured to identify a pedestrian who walks from the sidewalk toward the crosswalk or a pedestrian who walks from the crosswalk toward the sidewalk by analyzing the first and second detection signals received from the bollard device 100; and a warning signal provision unit 423 configured to provide a warning signal to the bollard device 100 when the pedestrian signal light is red and the pedestrian identification unit 422 identifies a pedestrian who walks from the sidewalk toward the crosswalk. The bollard device 100 includes a voice output unit 120 configured to generate a warning sound when a warning signal is received from the control device 400.

The camera image management unit 430 includes a pedestrian identification area setting unit 431 configured to receive an image captured by the camera 200 and to configure a pedestrian identification area for identifying a pedestrian who crosses the street at the crosswalk and a crosswalk-pedestrian recognition unit 432 configured to recognize that the pedestrian who crosses the street at the crosswalk is present in the pedestrian identification area configured in the image captured by the camera 200.

The lock screen application 500 further includes a crossing caution guidance unit 540 configured to display a sentence of a crossing caution on a screen of the terminal or generate a crossing caution guidance voice, when a screen of the terminal is changed into the locked state.

The lock screen application 500 further includes a beacon device identification unit 560 configured to identify whether a beacon signal received by the beacon signal reception identification unit 510 corresponds to a beacon device 300 positioned adjacent to the crosswalk.

DETAILED DESCRIPTION OF THE INVENTION

Exemplary embodiments of the present invention are described in detail with reference to the accompanying drawings.

Figure 1:
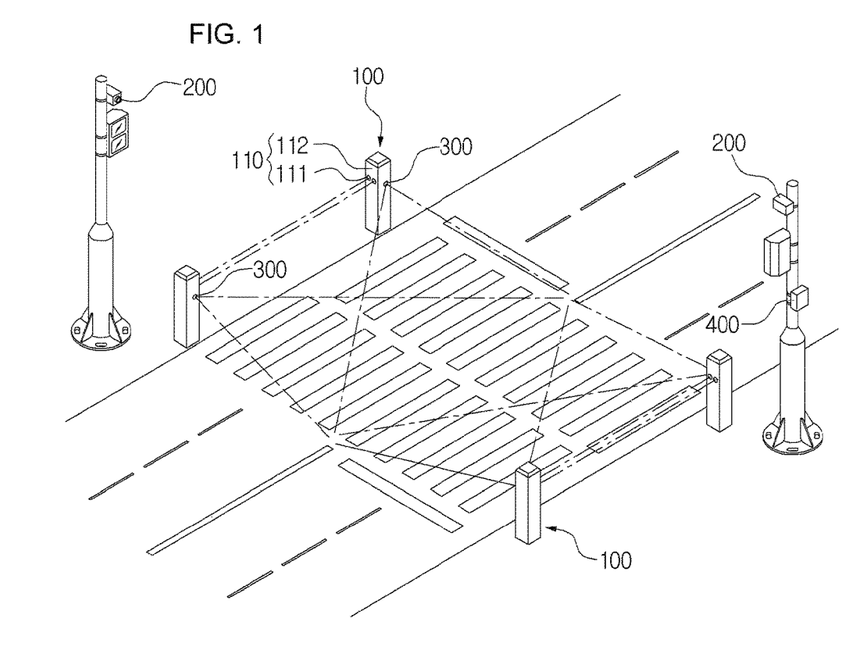
FIG. 1 is an exemplary diagram of a smart crosswalk safety system for a pedestrian according to an embodiment of the present invention.
Figure 2:
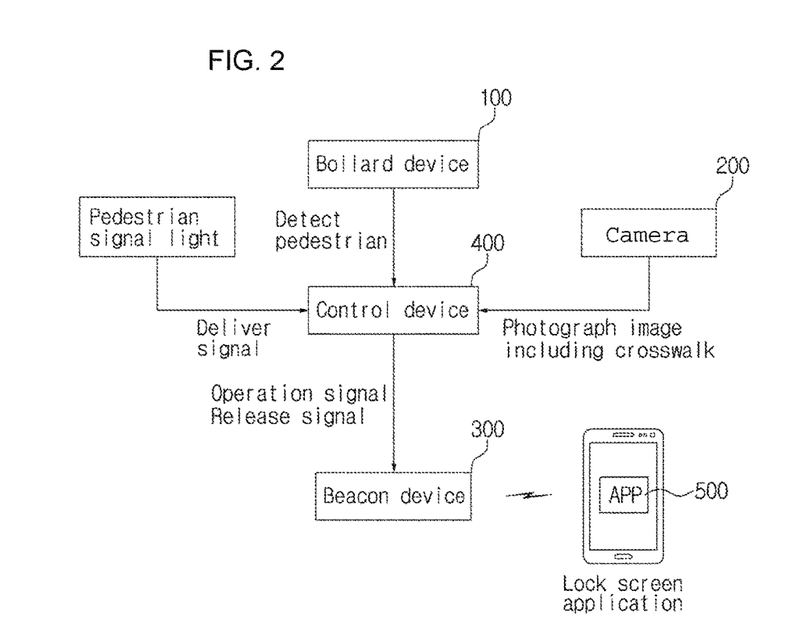
FIG. 2 is a block diagram of the smart crosswalk safety system for a pedestrian according to an embodiment of the present invention.

As shown in FIGS. 1 and 2, a safe crossing management system for a crosswalk according to an embodiment of the present invention includes bollard devices 100 disposed in a sidewalk where a pedestrian waits to cross a street at a crosswalk in such a way to face each other adjacent to one side of the crosswalk, a camera 200 configured to photograph the sidewalk including the crosswalk, a beacon device 300 configured to transmit a beacon signal toward the crosswalk, a control device 400 configured to control the bollard device 100 and the beacon device 300, and a lock screen application 500 installed in the pedestrian terminal of a pedestrian who crosses a street at the crosswalk to change a screen of the terminal to a locked state when a beacon signal is received. In this case, the pedestrian terminal includes a smartphone, a portable terminal or a mobile terminal having a communication function for receiving a beacon signal.

Figure 3:
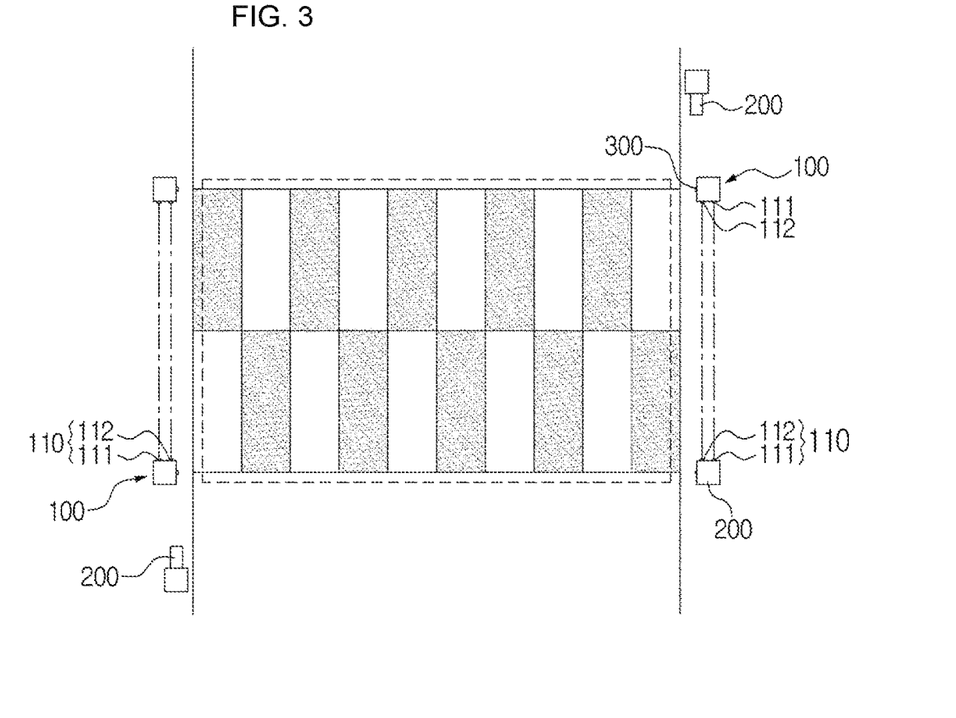
FIG. 3 is a block diagram of a bollard device 100 according to an embodiment of the present invention.

As shown in FIG. 3, the bollard devices 100 are disposed to face each other adjacent to one side of a crosswalk in a sidewalk where a pedestrian waits to cross a street at the crosswalk, and detect a pedestrian who walks toward the crosswalk and a pedestrian who walks from the crosswalk toward the sidewalk. The bollard device 100 includes a pedestrian identification sensor 110 and a sound output unit 120.

The pedestrian identification sensor 110 is positioned in the body of the bollard protruded from the ground in a given height, and detects a pedestrian who walks from a sidewalk toward a crosswalk and a pedestrian who walks from the crosswalk toward the sidewalk. The pedestrian identification sensor 110 includes a pair of a first pedestrian identification sensor 111 having a first light-emitting unit and a first light-receiving unit and a second pedestrian identification sensor 112 having a second light-emitting unit and a second light-receiving unit. The first pedestrian identification sensor 111 and the second pedestrian identification sensor 112 are horizontally disposed in such a way as to be spaced apart at a given interval. First and second detection signals sensed by the first and second pedestrian identification sensors 111 and 112 are provided to the control device 400. Accordingly, the control device 400 may identify a pedestrian who walks from a sidewalk toward a crosswalk or a pedestrian who walks from the crosswalk toward the sidewalk by identifying the sequence of the first and second detection signals of the first and second pedestrian identification sensors 111 and 112. For example, when the second pedestrian identification sensor 112 detects a second detection signal after the first pedestrian identification sensor 111 positioned closer to a sidewalk detects a first detection signal, the control device 400 may identify that a pedestrian walks from the sidewalk to a crosswalk. In contrast, when the first pedestrian identification sensor 111 detects a first detection signal after the second pedestrian identification sensor 112 detects a second detection signal, the control device 400 may identify that a pedestrian walks from a crosswalk to a sidewalk.

The voice output unit 120 generates a warning sound when a warning signal is received from the control device 400. In this case, the voice output unit 120 may generate a voice message, such as "Please wait in the sidewalk", using a speaker.

The bollard device 100 generates a warning sound through the sound output unit 120 when a pedestrian who walks from a sidewalk toward a crosswalk is detected based on a detection signal detected by the pedestrian identification sensor 110.

The camera 200 photographs a crosswalk and sidewalks adjacent to the crosswalk, and provides a captured image to the control device 400.

The beacon device 300 transmits a beacon signal when an operation signal is received while communicating with the control device 400. When a release signal is received from the control device 400, the beacon device 300 blocks the transmission of a beacon signal. The beacon device 300 may be positioned in the bollard device 100, may be positioned in the post of a pedestrian signal light or may be independently positioned near a crosswalk. The beacon device 300 may transmit a beacon signal to a pedestrian terminal using a communication method, such as Bluetooth Low Energy (BLE) or Wi-Fi. In some embodiments, the beacon device 300 may transmit a beacon signal using various communication methods supporting broadcasting communication.

Figure 4:
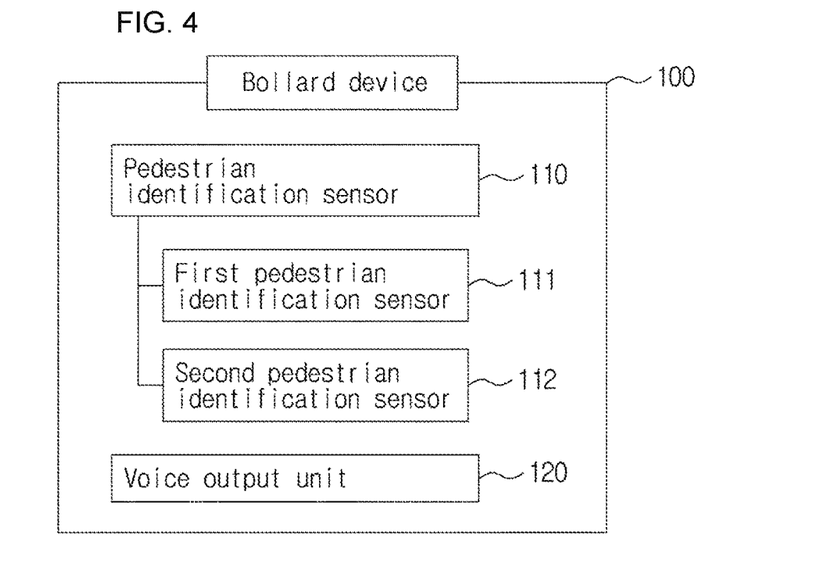
FIG. 4 is a block diagram of a control device 400 according to an embodiment of the present invention.

The control device 400 may be positioned in the bollard device 100, may be positioned in a signal controller (not shown) for controlling signal lights or may be configured as a separate inclusion body. The control device 400 controls operations of the pedestrian signal light, the bollard device 100 and the beacon device 300 while communicating with them or receives a detected signal. As shown in FIG. 4, the control device 400 includes a pedestrian signal management unit 410, a bollard device management unit 420, a camera image management unit 430, a beacon device management unit 440, and a beacon signal generator 450.

The pedestrian signal management unit 410 receives state information about the signal state of a pedestrian signal light from the signal controller (not shown). Accordingly, the pedestrian signal management unit 410 may identify whether the pedestrian signal light of a crosswalk is green or red.

The bollard device management unit 420 analyzes a detection signal, detected by the bollard device 100, while communicating with the bollard device 100, and provides a warning signal to the bollard device 100 when a pedestrian who walks from a sidewalk toward a crosswalk is identified based on a result of the analysis. The bollard device management unit 420 includes a detection signal receiver 421, a pedestrian identification unit 422 and a warning signal provision unit 423.

The detection signal receiver 421 receives first and second detection signals detected by the first and second pedestrian identification sensors 111 and 112 of the bollard device 100.

The pedestrian identification unit 422 analyzes first and second detection signals received from the bollard device 100, and identifies a pedestrian who walks from a sidewalk toward a crosswalk or a pedestrian who walks from the crosswalk toward the sidewalk. That is, when a second detection signal is detected after a first detection signal is detected, the pedestrian identification unit 422 identifies a pedestrian who walks from a sidewalk toward a crosswalk. When a first detection signal is detected after a second detection signal is detected, the pedestrian identification unit 422 identifies a pedestrian who walks from a crosswalk toward a sidewalk.

The warning signal provision unit 423 provides a warning signal to the bollard device 100 when a pedestrian signal light is red and the pedestrian identification unit 422 identifies a pedestrian who walks from a sidewalk toward a crosswalk.

The camera image management unit 430 configures a pedestrian identification area for identifying a pedestrian who has entered a crosswalk in an image received from the camera 200, and identifies whether a pedestrian is located in the pedestrian identification area. The camera image management unit 430 includes a pedestrian identification area setting unit 431 and a crosswalk-pedestrian recognition unit 432.

Figure 5:
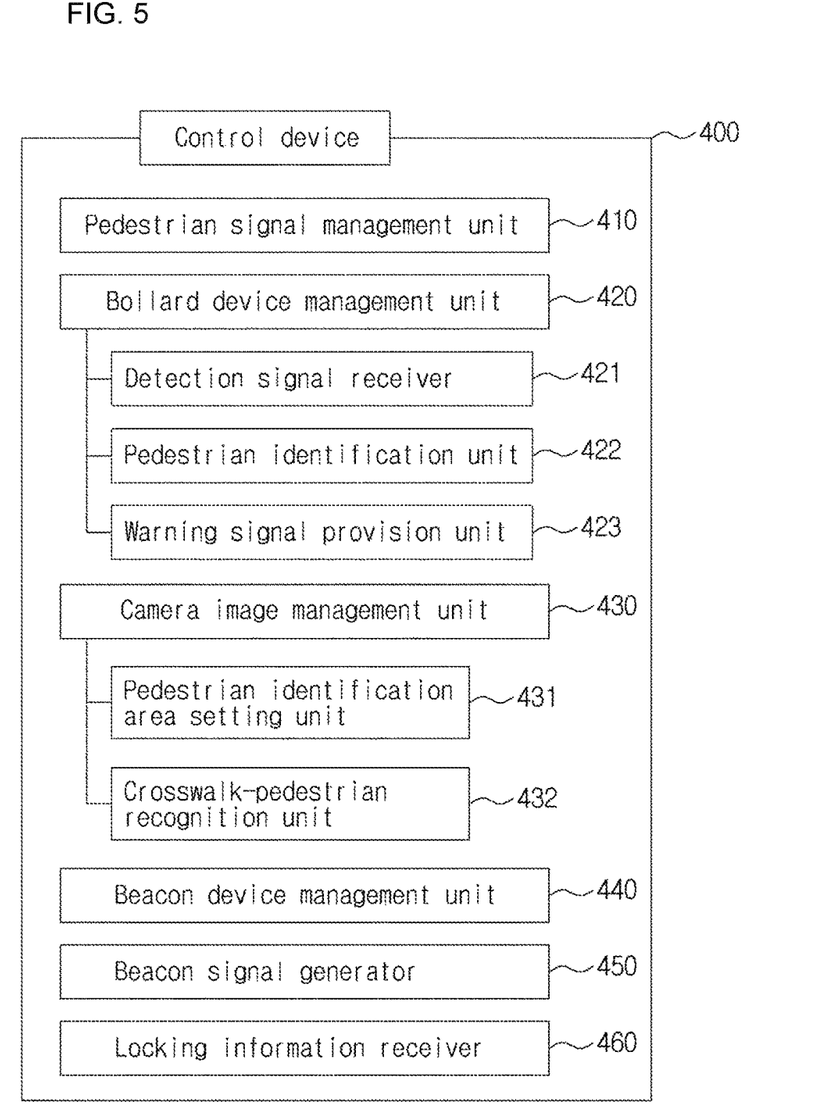
FIG. 5 shows an example in which a pedestrian identification area is configured in an image captured by a camera.

The pedestrian identification area setting unit 431 receives a captured image from the camera 200 and configures a pedestrian identification area (refer to FIG. 3) for identifying a person who has entered a crosswalk in the image. In this case, the pedestrian identification area setting unit 431 may divide the pedestrian identification area into a standby area, that is, a sidewalk area neighboring a street on the basis of the bollard device 100, and a crossing area, that is, the crosswalk area of the street.

When a pedestrian is located in a pedestrian identification area configured in an image captured by the camera 200, the crosswalk-pedestrian recognition unit 432 may recognize that the pedestrian crossing a street at a crosswalk is present. In this case, if the pedestrian identification area has been divided into a standby area and a crossing area, the crosswalk-pedestrian recognition unit 432 recognizes that a pedestrian crossing a street at a crosswalk is present only when the pedestrian is located in the crossing area.

The beacon device management unit 440 provides an operation signal so that a beacon signal is transmitted or provides a release signal so that a beacon signal is not transmitted, while communicating with the beacon device 300.

When the pedestrian identification unit 422 of the bollard device management unit 420 identifies a pedestrian who walks from a sidewalk toward a crosswalk and the crosswalk-pedestrian recognition unit 432 of the camera image management unit 430 recognizes that the pedestrian is located in a pedestrian identification area, the beacon signal generator 450 generates an operation signal for driving the beacon device 300 and provides it to the beacon device management unit 440. In other conditions, the beacon signal generator 450 generates a release signal for releasing an operation of the beacon device 300 and provides it to the beacon device management unit 440. Accordingly, if a pedestrian has passed the bollard device 100, but has not entered a street, the beacon signal generator 450 classifies the pedestrian as a person who waits to cross the street at a crosswalk in order to prevent a screen of a pedestrian terminal from being unnecessarily locked. When a pedestrian signal light is green, the beacon signal generator 450 may generate an operation signal for driving the beacon device 300 after a lapse of a specific time while operating in conjunction with a pedestrian signal. For example, if a green signal is 30 seconds, the beacon signal generator 450 may generate an operation signal for driving the beacon device 300 from a point of time after a lapse of 20 seconds after the pedestrian signal is changed into a green light in order to prevent a screen of a pedestrian terminal that rapidly moves from being locked.

The locking information receiver 460 stores locking information received from the lock screen application 500 of a pedestrian terminal. The number of pedestrians at a crosswalk may be checked based on the locking information received from the locking information receiver. Furthermore, the number of pedestrians crossing a street at a crosswalk when signal lights are green and the number of pedestrians who have crossed the street at the crosswalk when signal lights are red may be checked based on the received locking information in association with the signal time of the signal lights.

Figure 6:
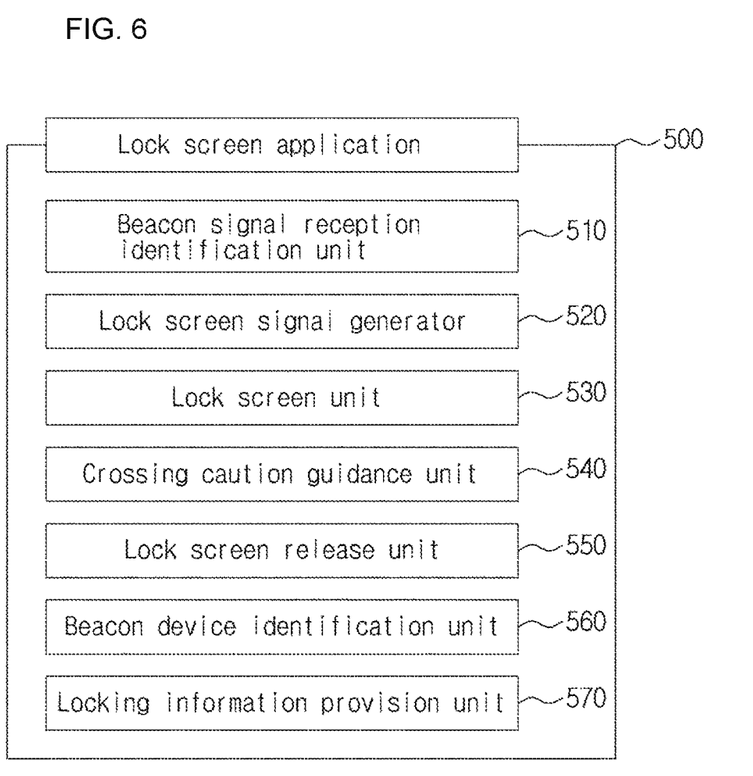
FIG. 6 is a block diagram of a lock screen application according to an embodiment of the present invention.

As shown in FIG. 6, the lock screen application 500 is installed in the pedestrian terminal of a pedestrian and changes a screen of the terminal to a locked state when a beacon signal is received. The lock screen application 500 includes a beacon signal reception identification unit 510, a lock screen signal generator 520, a lock screen unit 530, a crossing caution guidance unit 540 and a lock screen release unit 550, and may further include a beacon device identification unit 560.

The beacon signal reception identification unit 510 receives a beacon signal from a pedestrian terminal.

The lock screen signal generator 520 generates the lock screen signal of a terminal when a beacon signal is received from the beacon signal reception identification unit 510. The lock screen signal generator 520 does not generate a lock screen signal when a beacon signal is not received after a lock screen signal is generated.

When a lock screen signal is generated by the lock screen signal generator 520, the lock screen unit 530 changes a screen of a pedestrian terminal into a locked state.

When a screen of a terminal is changed into a locked state, the crossing caution guidance unit 540 displays a sentence, such as a crossing caution, on a screen of the terminal or generates a crossing caution guidance voice.

If a lock screen signal is not generated in the state in which a screen of a pedestrian terminal has changed into a locked state, the lock screen release unit 550 restores the locked state of the screen to the original state.

The beacon device identification unit 560 identifies whether a beacon signal received by the beacon signal reception identification unit 510 corresponds to the beacon device 300 positioned adjacent to a crosswalk. In this case, the beacon device identification unit 560 may transmit information of the received beacon signal to an external beacon management center, and may receive information regarding whether a corresponding beacon device 300 is a beacon device 300 registered with the beacon management center or identify whether the corresponding beacon device 300 is a beacon device 300 stored when the lock screen application is installed in a terminal by comparing the corresponding beacon device 300 with the stored beacon device 300.

When a lock screen signal is generated by the lock screen signal generator 520 and a screen of a pedestrian terminal is changed into a locked state, the locking information provision unit 570 provides locking information to the control device or an external management center. In this case, the locking information provision unit may also provide the time when the screen was changed into the locked state and the time when the screen was released from the locked state as the locking information.

Accordingly, while a pedestrian crosses a street at a crosswalk, the pedestrian can safely cross the street while looking round without keeping an eye on his or her pedestrian terminal because a screen of the pedestrian terminal is changed into a locked state.

Figure 7:
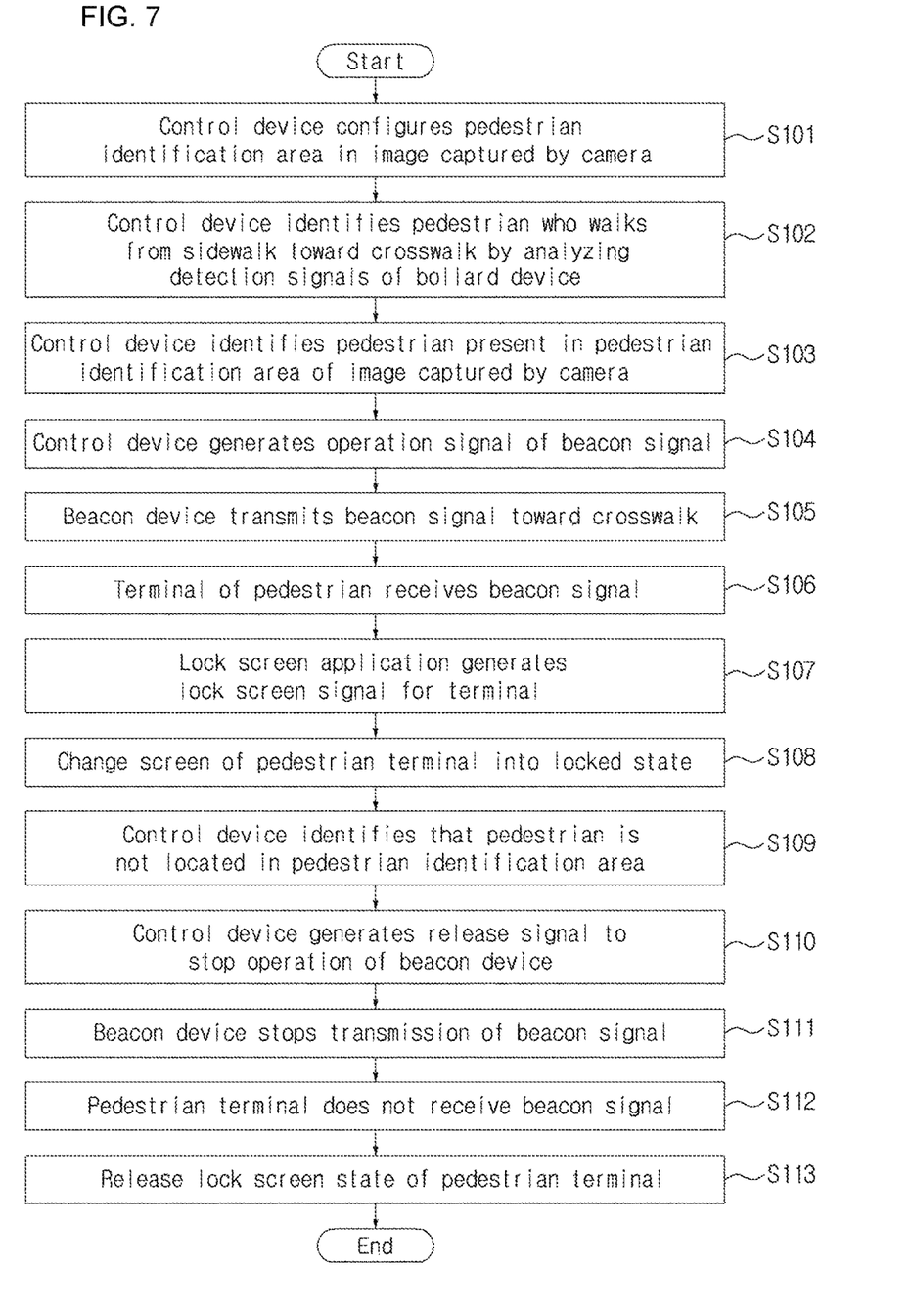
FIG. 7 is a flowchart showing an operation of the smart crosswalk safety system for a pedestrian according to an embodiment of the present invention.

An operation of the smart crosswalk safety system for a pedestrian according to an embodiment of the present invention is described below with reference to a flowchart of FIG. 7.

First, the control device 400 receives a captured image from the camera 200 and configures a pedestrian identification area for identifying a pedestrian who enters a crosswalk (S101). In this case, the control device 400 may configure the crosswalk of a street, spaced apart from the bollard device 100 at a given distance, as a pedestrian identification area, and may configure other areas as an area where a pedestrian waits to cross a street at the crosswalk.

The control device 400 analyzes first and second detection signals received from the bollard device 100, and identifies a pedestrian who walks from a sidewalk toward the crosswalk or a pedestrian who walks from the crosswalk toward the sidewalk (S102). That is, when the second detection signal is detected after the first detection signal is detected, the control device 400 identifies a pedestrian who walks from a sidewalk toward the crosswalk. When the first detection signal is detected after the second detection signal is detected, the control device 400 identifies a pedestrian who walks from the crosswalk toward the sidewalk.

When a pedestrian who walks from a sidewalk toward the crosswalk is identified through the first and second pedestrian identification sensors 111 and 112 of the bollard device 100 and the pedestrian is identified to be located in the pedestrian identification area of the image captured by the camera 200 (S103), the control device 400 generates an operation signal and provides it to the beacon device 300 so that a beacon signal is generated (S104).

When the operation signal of the control device 400 is received, the beacon device 300 generates a beacon signal toward the crosswalk (S105).

When the terminal of the pedestrian who enters the crosswalk receives the beacon signal (S106), the lock screen application 500 installed in the terminal generates a lock screen signal for the terminal (S107), and changes a screen of the pedestrian terminal into a locked state (S108). Furthermore, when a screen of the pedestrian terminal is changed into the locked state, the lock screen application 500 may display a sentence, such as a crossing caution, or generate a crossing caution guidance voice in order to call the attention of the pedestrian who crosses the street at the crosswalk.

When the control device 400 identifies that a pedestrian is not located in the crossing area of the image captured by the camera 200 (S109), it generates a release signal to stop the operation of the beacon device 300 and provides the release to the beacon device 300 (S110).

Furthermore, when the release signal of the control device 400 is received, the beacon device 300 stops the transmission of a beacon signal toward the crosswalk (S111).

Furthermore, if a beacon signal is not received (S112), the lock screen application 500 releases the locked state for the screen of the terminal so that the pedestrian can use the terminal (S113).

As described above, a screen of the terminal of a pedestrian is changed into a locked state and the pedestrian passes the bollard device 100 only when the pedestrian who walks from a sidewalk toward a crosswalk is identified through the bollard device 100 and the pedestrian is located in a pedestrian identification area configured in the crosswalk of a street based on an image captured by the camera 200. Accordingly, a problem in that a screen of the terminal of a pedestrian who waits to cross a street at a crosswalk without entering the crosswalk is unnecessarily changed into a locked state can be prevented. Furthermore, an accident for a pedestrian who crosses a street at a crosswalk can be prevented.

As described above, although the present invention has been described in connection with the limited embodiments and drawings, the present invention is not limited to the embodiments and drawings. A person having ordinary skill in the art to which the present invention pertains may modify and change the present invention within the technical spirit of the present invention and the equivalent range of the following claims.

What is claimed is:

1. A smart crosswalk safety system for a pedestrian, the system comprising:
    bollard devices disposed in a sidewalk where a pedestrian waits to cross a street at a crosswalk in such a way to face each other adjacent to one side of the crosswalk, each bollard device comprising a pedestrian identification sensor for detecting a pedestrian who walks from the sidewalk toward the crosswalk and a pedestrian who walks from the crosswalk toward the sidewalk;
    a camera configured to photograph an area comprising the crosswalk;
    a beacon device configured to transmit a beacon signal toward the crosswalk when an operation signal is received while communicating with the control device and to block transmission of a beacon signal when a release signal is received from the control device;
    the control device configured to control the bollard device and the beacon device; and
    a lock screen application installed in a pedestrian terminal of a pedestrian who crosses the street at the crosswalk to change a screen of the terminal into a locked state when a beacon signal is received,
    wherein the control device comprises:
    a bollard device management unit configured to analyze a detection signal detected by the bollard device while communicating with the bollard device and to provide a warning signal to the bollard device when a pedestrian who walks from the sidewalk toward the crosswalk is identified based on a result of the analysis;
    a camera image management unit configured to configure a pedestrian identification area for identifying the pedestrian who has entered the crosswalk in an image received from the camera and to identify whether the pedestrian is located in the pedestrian identification area;
    a beacon device management unit configured to provide an operation signal so that a beacon signal is transmitted or provide a release signal so that a beacon signal is not transmitted while communicating with the beacon device; and
    a beacon signal generator configured to generate an operation signal to drive the beacon device and provide the generated operation signal to the beacon device management unit, when the bollard device management unit identifies a pedestrian who walks from the sidewalk toward the crosswalk and the camera image management unit identifies the pedestrian located in the pedestrian identification area, and to generate a release signal to release an operation of the beacon device and provide the generated release signal to the beacon device management unit in other conditions,
    wherein the lock screen application comprises:
    a beacon signal reception identification unit configured to receive a beacon signal received by a pedestrian terminal;
    a lock screen signal generator configured to generate a lock screen signal for the terminal when a beacon signal is received by the beacon signal reception identification unit;
    a lock screen unit configured to change a screen of the pedestrian terminal into the locked state when a lock screen signal is generated by the lock screen signal generator; and
    a lock screen release unit configured to restore the locked state of the screen to an original state when a lock screen signal is not generated in a state in which the screen of the pedestrian terminal has been changed into the locked state, and
    wherein the pedestrian identification sensor comprises a pair of a first pedestrian identification sensor having a first light-emitting unit and a first light-receiving unit and a second pedestrian identification sensor horizontally positioned and spaced apart from the first pedestrian identification sensor and having a second light-emitting unit and a second light-receiving unit.

2. The smart crosswalk safety system of claim 1,
    wherein the control device further comprises a pedestrian signal management unit configured to receive state information about a signal state of a pedestrian signal light, and
    wherein the bollard device management unit comprises:
    a detection signal receiver configured to receive first and second detection signals detected by the first and second pedestrian identification sensors of the bollard device;
    a pedestrian identification unit configured to identify a pedestrian who walks from the sidewalk toward the crosswalk or a pedestrian who walks from the crosswalk toward the sidewalk by analyzing the first and second detection signals received from the bollard device; and
    a warning signal provision unit configured to provide a warning signal to the bollard device when the pedestrian signal light is red and the pedestrian identification unit identifies a pedestrian who walks from the sidewalk toward the crosswalk, and
    wherein the bollard device comprises a voice output unit configured to generate a warning sound when a warning signal is received from the control device.

3. The smart crosswalk safety system of claim 1, wherein the camera image management unit comprises:
    a pedestrian identification area setting unit configured to receive an image captured by the camera and to configure a pedestrian identification area for identifying a pedestrian who crosses the street at the crosswalk, and
    a crosswalk-pedestrian recognition unit configured to recognize that the pedestrian who crosses the street at the crosswalk is present in the pedestrian identification area configured in the image captured by the camera.

4. The smart crosswalk safety system of claim 1, wherein the lock screen application further comprises a crossing caution guidance unit configured to display a sentence of a crossing caution on a screen of the terminal or generate a crossing caution guidance voice, when a screen of the terminal is changed into the locked state.

5. The smart crosswalk safety system of claim 1, wherein the lock screen application further comprises a beacon device identification unit configured to identify whether a beacon signal received by the beacon signal reception identification unit corresponds to a beacon device positioned adjacent to the crosswalk.

6. The smart crosswalk safety system of claim 1, wherein the beacon signal generator generates an operation signal to drive the beacon device after a lapse of a specific time when the pedestrian signal light is green while operating in conjunction with a pedestrian signal.

7. A smart crosswalk safety system for a pedestrian, the system comprising:

bollard devices disposed in a sidewalk where a pedestrian waits to cross a street at a crosswalk in such a way to face each other adjacent to one side of the crosswalk, each bollard device comprising a pedestrian identification sensor for detecting a pedestrian who walks from a sidewalk toward the crosswalk and a pedestrian who walks from the crosswalk toward the sidewalk;

a camera configured to photograph an area comprising the crosswalk;

a beacon device configured to transmit a beacon signal toward the crosswalk when an operation signal is received while communicating with the control device and to block transmission of a beacon signal when a release signal is received from the control device;

the control device configured to control the bollard device and the beacon device; and a lock screen application installed in a pedestrian terminal of a pedestrian who crosses the street at the crosswalk to change a screen of the terminal into a locked state when a beacon signal is received, wherein the control device comprises:

a bollard device management unit configured to analyze a detection signal detected by the bollard device while communicating with the bollard device and to provide a warning signal to the bollard device when a pedestrian who walks from the sidewalk toward the crosswalk is identified based on a result of the analysis;

a camera image management unit configured to configure a pedestrian identification area for identifying the pedestrian who has entered the crosswalk in an image received from the camera and to identify whether the pedestrian is located in the pedestrian identification area;

a beacon device management unit configured to provide an operation signal so that a beacon signal is transmitted or provide a release signal so that a beacon signal is not transmitted while communicating with the beacon device; and a beacon signal generator configured to generate an operation signal to drive the beacon device and provide the generated operation signal to the beacon device management unit, when the bollard device management unit identifies a pedestrian who walks from the sidewalk toward the crosswalk and the camera image management unit identifies the pedestrian located in the pedestrian identification area, and to generate a release signal to release an operation of the beacon device and provide the generated release signal to the beacon device management unit in other conditions, wherein the lock screen application comprises:

a beacon signal reception identification unit configured to receive a beacon signal received by a pedestrian terminal;

a lock screen signal generator configured to generate a lock screen signal for the terminal when a beacon signal is received by the beacon signal reception identification unit;

a lock screen unit configured to change a screen of the pedestrian terminal into the locked state when a lock screen signal is generated by the lock screen signal generator;

a lock screen release unit configured to restore the locked state of the screen to an original state when a lock screen signal is not generated in a state in which the screen of the pedestrian terminal has been changed into the locked state; and a locking information provision unit configured to provide locking information to the control device or an external management center when a screen of the pedestrian terminal is changed into the locked state in response to a lock screen signal generated by the lock screen signal generator.

* * * * *